(12) United States Patent
Yamakabe et al.

(10) Patent No.: US 8,046,764 B2
(45) Date of Patent: Oct. 25, 2011

(54) REDISTRIBUTION OF UNUSED RESOURCES ASSIGNED TO A FIRST VIRTUAL COMPUTER HAVING USAGE BELOW A PREDETERMINED THRESHOLD TO A SECOND VIRTUAL COMPUTER

(75) Inventors: Takashi Yamakabe, Yokohama (JP); Shuji Fujino, Ayase (JP)

(73) Assignee: Hitachi, Ltd., Tokyo (JP)

( * ) Notice: Subject to any disclaimer, the term of this patent is extended or adjusted under 35 U.S.C. 154(b) by 1595 days.

(21) Appl. No.: 10/938,540

(22) Filed: Sep. 13, 2004

(65) Prior Publication Data
US 2005/0235288 A1    Oct. 20, 2005

(30) Foreign Application Priority Data
Apr. 20, 2004   (JP) .................................. 2004-123760

(51) Int. Cl.
G06F 9/46       (2006.01)
G06F 15/173     (2006.01)

(52) U.S. Cl. .......................... 718/104; 718/105; 709/226

(58) Field of Classification Search .............. 718/1, 100, 718/101, 102, 103, 104, 105
See application file for complete search history.

(56) References Cited

U.S. PATENT DOCUMENTS

| | | | |
|---|---|---|---|
| 6,393,455 B1* | 5/2002 | Eilert et al. .................... | 718/105 |
| 6,725,317 B1 | 4/2004 | Bouchier et al. | |
| 6,980,511 B1* | 12/2005 | Li et al. .......................... | 370/230 |
| 7,058,947 B1* | 6/2006 | Raja et al. ..................... | 718/104 |
| 7,093,250 B1* | 8/2006 | Rector .......................... | 718/100 |
| 7,191,440 B2* | 3/2007 | Cota-Robles et al. ............ | 718/1 |
| 7,266,823 B2* | 9/2007 | Alford, Jr. ..................... | 718/104 |
| 7,310,673 B2* | 12/2007 | Zhu et al. ....................... | 709/226 |
| 7,313,796 B2* | 12/2007 | Hamilton et al. ............. | 718/104 |
| 7,334,036 B2* | 2/2008 | Ando et al. .................... | 709/224 |
| 7,415,708 B2* | 8/2008 | Knauerhase et al. ............. | 718/1 |
| 7,424,713 B2* | 9/2008 | Fujino ........................... | 718/104 |
| 7,437,730 B2* | 10/2008 | Goyal ........................... | 718/105 |
| 7,454,652 B2* | 11/2008 | Haga et al. ......................... | 714/4 |
| 7,784,053 B2* | 8/2010 | Casey et al. ..................... | 718/104 |
| 2002/0013802 A1* | 1/2002 | Mori et al. ........................ | 709/1 |
| 2002/0016785 A1* | 2/2002 | Sirgany .......................... | 706/46 |
| 2002/0049608 A1* | 4/2002 | Hartsell et al. .................... | 705/1 |
| 2002/0087611 A1* | 7/2002 | Tanaka et al. .................... | 709/1 |

(Continued)

FOREIGN PATENT DOCUMENTS

| | | |
|---|---|---|
| JP | 8-212096 A | 8/1996 |
| JP | 2002-14909 | 1/2002 |
| JP | 2002-530780 | 9/2002 |
| JP | 2004-62911 A | 2/2004 |
| WO | WO 00/31652 | 6/2000 |

*Primary Examiner* — Meng An
*Assistant Examiner* — Abdullah Al Kawsar
(74) *Attorney, Agent, or Firm* — Mattingly & Malur, PC

(57) ABSTRACT

A computer resource control system for running business applications on virtual computers within a business computer by using computer, virtual computer, network, and storage resources, the system comprises a collection process section for periodically collecting the dynamically changing information about the use of each resource when business applications run on the virtual computers within the business computer; a resource recovery process section for calculating the amounts of resources required for the operations of the business applications periodically in accordance with the dynamically changing information about the use of each resource, which is gathered by the collection process section, allocating the calculated amounts of resources to the resources of each virtual computer, and recovering any extra resources; and a resource allocation process section for allocating the extra resources, which are recovered by the resource recovery process section, to the virtual computers in accordance with the priorities of the business applications.

8 Claims, 15 Drawing Sheets

U.S. PATENT DOCUMENTS

| | | | |
|---|---|---|---|
| 2002/0112102 A1* | 8/2002 | Tarui et al. | 710/60 |
| 2003/0037092 A1* | 2/2003 | McCarthy et al. | 709/104 |
| 2003/0158940 A1* | 8/2003 | Leigh | 709/226 |
| 2003/0172145 A1* | 9/2003 | Nguyen | 709/223 |
| 2004/0260758 A1* | 12/2004 | Hirata et al. | 709/200 |
| 2005/0044228 A1* | 2/2005 | Birkestrand et al. | 709/226 |
| 2005/0119996 A1* | 6/2005 | Ohata et al. | 707/3 |
| 2005/0132362 A1* | 6/2005 | Knauerhase et al. | 718/1 |
| 2007/0028244 A1* | 2/2007 | Landis et al. | 718/108 |

\* cited by examiner

| No. | SUB-MANAGEMENT COMPUTER | SUB-MANAGEMENT COMPUTER ADDRESS |
|---|---|---|
| 1 | Tokyo | $a_1, a_2, a_3, a_4$ |
| 2 | NewYork | $b_1, b_2, b_3, b_4$ |
| 3 ⟨ n | ⋮ | ⋮ |

FIG. 5

| BUSINESS APPLICATION | CPU | MEMORY | NETWORK | STORAGE | |
|---|---|---|---|---|---|
| AP1 | 10 | 30 | 20 | 10 | ~120 |
| AP2 | 30 | 20 | 10 | 20 | ~121 |
| AP3 | 20 | 10 | 20 | 30 | ~122 |
| ⋮ | ⋮ | ⋮ | ⋮ | ⋮ | |

FIG. 6

| RESOURCE TYPE | CAPACITY | WEIGHT VALUE | |
|---|---|---|---|
| CPU | 1GHz | 1 | ~130 |
| | 2GHz | 2 | ~131 |
| | 3GHz | 3 | ~132 |
| | ⋮ | ⋮ | |
| MEMORY | 1GB | 1 | ~133 |
| | 2GB | 2 | ~134 |
| | 3GB | 3 | ~135 |
| | ⋮ | ⋮ | |
| NETWORK | 1Gbps | 1 | ~136 |
| | 2Gbps | 2 | ~137 |
| | 3Gbps | 3 | ~138 |
| | ⋮ | ⋮ | |
| STORAGE | 100Mbps | 1 | ~139 |
| | 200Mbps | 2 | ~140 |
| | 300Mbps | 3 | ~141 |
| | ⋮ | ⋮ | |

| No. | BUSINESS COMPUTER | BUSINESS COMPUTER ADDRESS | VIRTUAL COMPUTER | STORAGE PATH | BUSINESS APPLICATION | BUSINESS APPLICATION OPERATION STATUS |
|---|---|---|---|---|---|---|
| 1 | Tokyo 1 | $c_1, c_2, c_3, c_4$ | — | XXX | — | — |
| 2 | Tokyo 1 | $c_1, c_2, c_3, c_4$ | Tokyo 1-1 | YYY | AP1 | STOPPED |
| 3 | Tokyo 1 | $c_1, c_2, c_3, c_4$ | Tokyo 1-2 | ZZZ | AP2 | OPERATING |
| 4 ⁞ q | ⁞ | ⁞ | ⁞ | ⁞ | ⁞ | ⁞ |

| BUSINESS COMPUTER | CPU | MEMORY | NETWORK | STORAGE | |
|---|---|---|---|---|---|
| A | 2GHz | 3GB | 50Mbps | 200Mbps | ~100 |
| B | 3GHz | 2GB | 30Mbps | 100Mbps | ~101 |
| C | 1GHz | 2GB | 40Mbps | 300Mbps | ~102 |
| ⋮ | ⋮ | ⋮ | ⋮ | ⋮ | |

Columns: 203, 124, 125, 126, 127

| BUSINESS APPLICATION | BUSINESS COMPUTER | VIRTUAL COMPUTER | CPU | MEMORY | NETWORK | STORAGE | |
|---|---|---|---|---|---|---|---|
| AP1 | A | A1 | 30% | 40% | 60% | 30% | ~110 |
| AP2 | A | A2 | 60% | 100% | 20% | 50% | ~111 |
| AP3 | A | A3 | 40% | 70% | 40% | 10% | ~112 |
| AP4 | B | B1 | 100% | 10% | 30% | 40% | ~113 |
| AP5 | B | B2 | 60% | 30% | 10% | 30% | ~114 |
| ⋮ | ⋮ | ⋮ | ⋮ | ⋮ | ⋮ | ⋮ | |

Columns: 123, 203, 205, 124, 125, 126, 127

FIG. 12

| BUSINESS APPLICATION | CPU | MEMORY | NETWORK | STORAGE | |
|---|---|---|---|---|---|
| AP1 | 40% | 30% | 30% | 20% | ~220 |
| AP2 | 30% | 20% | 30% | 40% | ~221 |
| AP3 | 30% | 40% | 20% | 40% | ~222 |
| TOTAL | 100% | 90% | 80% | 100% | ~223 |
| UNUSED RESOURCE | 0% | 10% | 20% | 0% | ~224 |

Columns: 123, 124, 125, 126, 127. Table 215.

FIG. 13

| BUSINESS APPLICATION | PRIORITY | |
|---|---|---|
| AP1 | HIGH | ~230 |
| AP2 | MEDIUM | ~231 |
| AP3 | LOW | ~232 |

Columns: 123, 233. Table 216.

US 8,046,764 B2

REDISTRIBUTION OF UNUSED RESOURCES ASSIGNED TO A FIRST VIRTUAL COMPUTER HAVING USAGE BELOW A PREDETERMINED THRESHOLD TO A SECOND VIRTUAL COMPUTER

CLAIM OF PRIORITY

The present application claims priority from Japanese application JP 2004-123760 filed on Apr. 20, 2004, the content of which is hereby incorporated by reference into this application.

BACKGROUND OF THE INVENTION

The present invention relates to a resource control method and system for allocating virtual computer resources, storage resources, and network resources within a system that runs a business application on a virtual computer.

Conventionally, the resource to be allocated was determined in advance. Resource allocation was carried out after comparing the resource's fixed value with the actual performance. Further, computer system resources were targeted for allocation. Storage resources were not targeted for allocation.

A conventional method disclosed, for instance, by Japanese Patent Laid-Open (PCT) No. 530780/2002 permits reconfiguration for optimizing the computer system capacities for processing an application by using a virtual computer operating technology in order to allocate a programmable logic resource to a plurality of application functions on the basis of a comparison between performance measurements taken in a computer system and prescribed performance requirements.

SUMMARY OF THE INVENTION

When a conventional technology was used, computer resources were allocated for the purpose of running a business application. However, a fixed standard based on experience was used without taking operating environment changes into consideration. The data used by a business application is more frequently stored in a storage resource than ever. However, no technology has been available for exercising control with computer resources and storage resources combined.

It is an object of the present invention to provide a resource control method and system that are capable of maintaining and managing the relationship among computer, virtual computer, network, and storage resources, dynamically calculating the allocation ratios of the computer, virtual computer, network, and storage resources, and achieving allocation and reallocation in order to steadily run a business application.

To achieve the above object, one aspect of the present invention provides a resource control method and system for running a business application on each virtual computer within a business computer by using computer, virtual computer, network, and storage resources. The resource control method according to the present invention comprises a collection step and resource recovery process step. The collection step periodically collects the dynamically changing information about the use of each resource when a business application runs on each virtual computer within the business computer. The resource recovery process step calculates the amounts of resources required for the operation of the business application periodically and dynamically in accordance with dynamically changing information about the use of each resource, which is gathered in the collection step, allocates the calculated resources to the resources of each virtual computer, and recovers any extra resources.

The resource control method according to the present invention may further comprise a resource allocation process step for increasing or decreasing the amounts of extra resources, which are collected in the resource recovery process step, and allocating the resulting amounts of extra resources to the virtual computers in accordance with the priority of the business application.

Another aspect of the present invention provides a resource control method and system for running a business application on each virtual computer within a business computer by using computer, virtual computer, network, and storage resources. The resource control method according to the present invention comprises a collection step, a resource recovery process step, and a resource allocation process step. The collection step periodically collects the dynamically changing information about the use of each resource when a business application runs on each virtual computer within the business computer. The resource recovery process step calculates the amounts of resources required for the operation of the business application periodically in accordance with dynamically changing information about the use of each resource, which is gathered in the collection step, allocates the calculated resources to the resources of each virtual computer, and recovers any extra resources. The resource allocation process step allocates the extra resources, which are recovered in the resource recovery process step, to the virtual computers in accordance with the priority of the business application.

The resource allocation process step according to the present invention may include a calculation step for dynamically calculating the individual resource allocation ratios to avoid the allocation of extra resources.

The resource allocation process step according to the present invention may include a step for creating a business list in which a plurality of business applications are listed in descending order of priority, sequentially allocating the extra resources, which are recovered in the resource recovery step, to the listed business applications in descending order of priority, and sequentially deleting the allocated business applications from the business list to ensure that the business applications to be allocated remain in the business list.

The resource allocation process step according to the present invention may include a step for ensuring that the current resource allocations for the business applications are reflected in a resource allocation table.

The present invention may also include a business application deletion step for deallocating (releasing) the resources that run a specified business application, deleting the specified business application from the resource allocation table, and updating the total allocation value and unused resource value in the resource allocation table for the purpose of allowing the resources for the other business applications to be allocated to the unused resources.

Further, the present invention may also include a business application addition step for checking whether the information about a specified business application exists in a distribution optimization table. If the specified business application is found in the table, the business application addition step gives an optimum value of the distribution optimization table as a resource allocation amount. If the specified business application is not found in the table, the business application addition step gives a default value as the resource allocation amount. If, as a result, adequate amounts of resources are available, the business application addition step acquires the resources for the specified business application, updates the resource allocation table, and generates a virtual computer to execute the specified business application.

The present invention makes it possible to steadily run business applications on virtual computers by dynamically allocating and reallocating the resources in accordance with the priorities of the business applications while considering the information about computer resource use, virtual computer resource use, network resource use, and storage resource use.

BRIEF DESCRIPTION OF THE DRAWINGS

FIG. 5 illustrates a table that manages the optimum resource allocation amount for each business application;
FIG. 6 illustrates a table that manages the weight values for the capacities of various resources;
FIG. 9 illustrates a table that manages the resource capacities of business computers;
FIG. 10 illustrates a table that manages the performance information about virtual computers;
FIG. 12 illustrates a table that manages the resource allocations to virtual computers within a business computer, the total amounts of allocations, and the amounts of available resources;
FIG. 13 illustrates a table that manages the priorities of business applications within a business computer.

DETAILED DESCRIPTION OF THE PREFERRED EMBODIMENTS

Embodiments for maintaining and managing the relationship among business computer, virtual computer, network, and storage resources and steadily running business applications in accordance with the present invention will now be described in detail with reference to the accompanying drawings.

Figure 1:
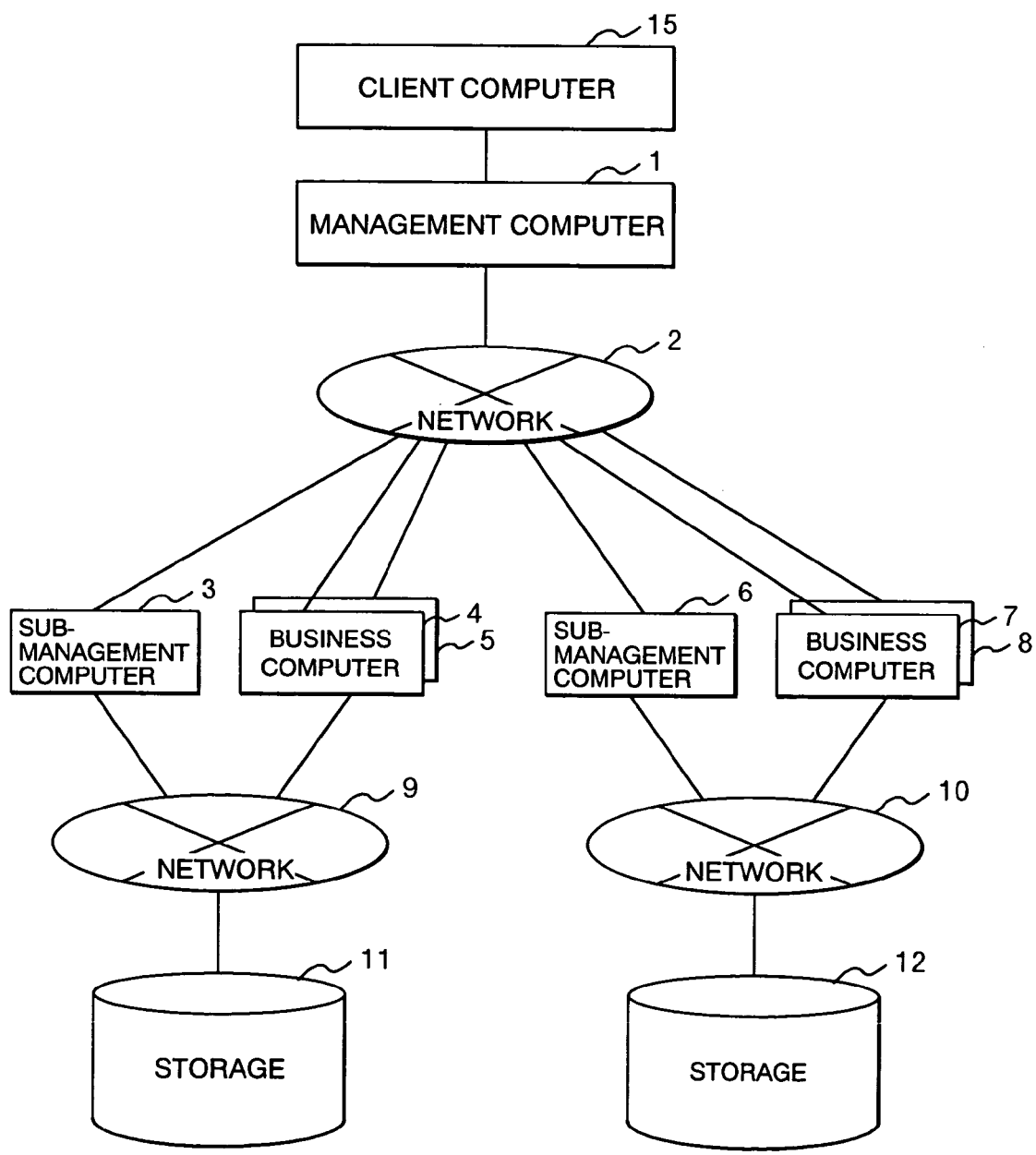
FIG. 1 illustrates the overall structure of one embodiment according to the present invention.

FIG. 1 illustrates one embodiment of a system's physical configuration according to the present invention. A management computer 1, sub-management computers 3, 6, and business computers 4, 5, 7, 8 are connected to a network 2. Sub-management computer 3 and business computers 4 and 5 are connected to a network 9 that is exclusively used as a SAN (Storage Area Network) or for other storage purpose. Storage 11 is connected to network 9. Similarly, sub-management computer 6 and business computers 7 and 8 are similarly connected to network 10 that is exclusively used for storage purposes. Storage 12 is connected to network 10. The management computer 1 manages sub-management computers 3 and 6. Sub-management computer 3 manages business computers 4 and 5. Sub-management computer 6 manages business computers 7 and 8. A client computer 15 is connected to the management computer 1. A manager can request the management computer to perform a process by manipulating the GUI screen of the client computer 15.

A plurality of business applications run on business computers 4, 5, 7, and 8. The business applications can perform a process by using data in storages 11 and 12 via networks 9 and 10.

Figure 2:
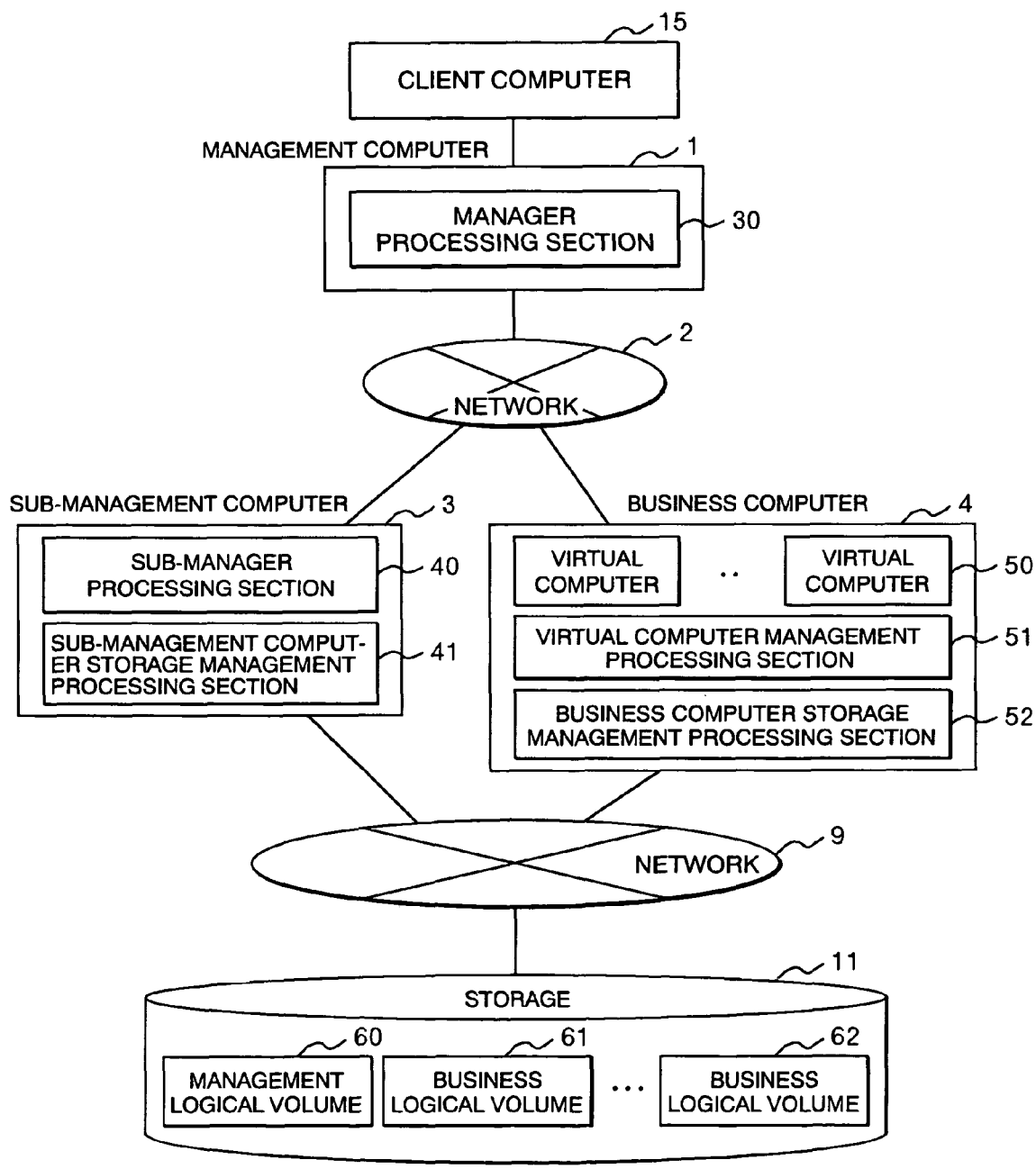
FIG. 2 shows the details of each element shown in FIG. 1.

FIG. 2 illustrates the logical configuration of a scheme shown in FIG. 1. For ease of explanation, the figure merely shows one sub-management computer, one business computer, and one client computer.

The management computer 1 has a manager processing section 30. The sub-management computer 3 has a sub-manager processing section 40 and a sub-management computer storage management processing section 41. FIG. 2 indicates that the manager processing section 30 and sub-manager processing section 40 exist in different computers. However, they may be positioned in the same computer. The sub-manager processing section 40 may also be positioned in the business computer 4. The business computer 4 has a plurality of virtual computers 50, a virtual computer management processing section 51, and a business computer storage management processing section 52. Business applications run on the virtual computers 50. A plurality of business applications may run on a single virtual computer. For ease of explanation, however, it is assumed that one business application runs on one virtual computer. In compliance with a request from the client computer 15, the manager processing section 30 can coordinate with the sub-manager processing section 40 to acquire the information about the use of the business computers managed by the sub-manager processing section 40 or start/stop a business application on the business computer 4. The information acquired in this manner may relate to various resources. For ease of explanation, however, it is assumed that the acquired information is the dynamic resource distribution information (capacity information and other similar items of information included) about computer (CPU and memory), network, and storage resources. The storage 11 has a management logical volume 60 and business logical volumes 61, 62. The management logical volume 60 is an area for storing the dynamic resource distribution information about the business computers 4, 5 that are managed by the sub-management computer 3. The business logical volumes 61, 62 are storage areas for storing, for instance, the data that are used by business application programs executed by the virtual computers 50 within business computer 4.

Figures 3, 4:
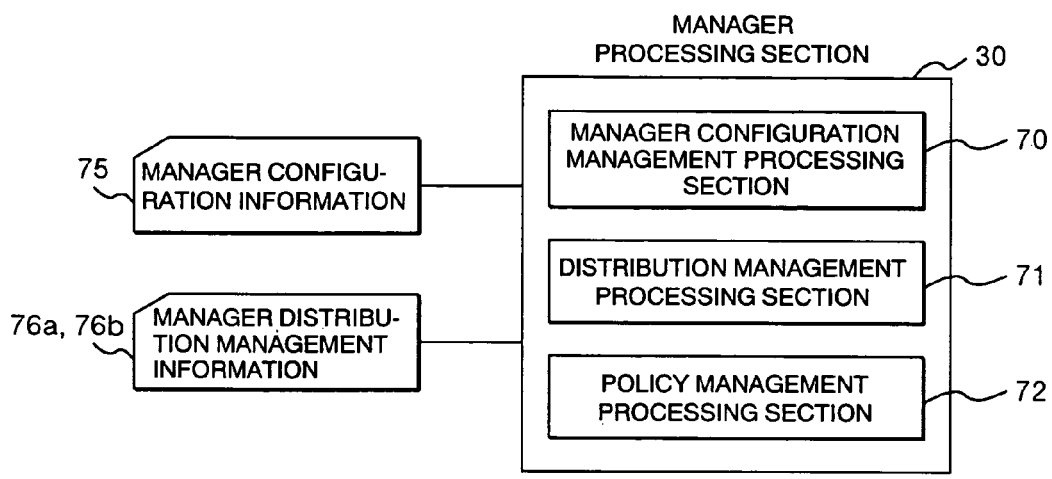
FIG. 3 shows the details of a manager processing section.
FIG. 4 illustrates a table that presents manager configuration information.

FIG. 3 shows the details of the manager processing section 30. The manager processing section 30 has a manager configuration management processing section 70, a distribution management processing section 71, and a manager policy management processing section 72. The manager configuration management processing section 70 manages, processes, and retains manager configuration information 75 such as the information about sub-management computer 3, which is shown in FIG. 4. The distribution management processing section 71 manages, processes, and retains manager distribution management information 76a, 76b of the resource distribution information (resource capacity information and other similar items of information included) about business computers 4 and 5, which are shown in FIGS. 5 and 6. The manager policy management processing section 72 exercises policy management over, for instance, the priorities of business applications to be executed by the virtual computers 50.

FIG. 4 shows the details of the manager configuration information 75 that the manager configuration management processing section 70 of the manager processing section 30 shown in FIG. 3 manages, processes, and retains, for instance, for sub-management computer (Tokyo, New York, . . . ) addition/deletion. The information about sub-management computers 85 and the addresses 86 of the sub-management computers are to be retained as the manager configuration information 75. The retained information enables the manager processing section 30 to locate sub-management computer 3 that the manager processing section 30 should manage, and communicate with such sub-management computer 3. When a sub-management computer is to be added/deleted, the manager configuration management processing section 70 registers/deletes the information about the sub-management computer.

FIGS. 5 and 6 show the details of manager distribution management information (resource distribution optimization table 76a and resource capacity weighting table 76b). The manager distribution management information is managed, processed, and retained by the distribution management processing section 71 of the manager processing section 30 shown in FIG. 3. The manager distribution management information relates, for instance, to updates of resource distribution combinations that are used when the business applications (AP1, AP2, AP3, . . . ) run normally while the processing capacity differences among the business computer resources (CPU, memory, network, and storage) are absorbed to ensure that the amounts of given resources are neither excessive nor insufficient.

FIG. 5 shows the resource distribution optimization table 76a, which retains appropriate resource distribution values (120, 121, 122, . . . ) for the business applications (AP1, AP2, AP3, . . . ) 123. The table has appropriate resource distribution values for combinations of resources, including computer resources such as a CPU 124 and memory 125, a network 126, and a storage 127. The amounts of resources required for a business application vary with time because the data amount and processing volume vary with time. Therefore, the appropriate resource distribution values vary at all times. It means that there is no optimum resource distribution combination for a specific business application. The table manages the resource distribution combinations that prevail when the business applications run normally and the amounts of given resources are neither excessive nor insufficient. The values in the table 76a are updated as needed after a resource recovery process (FIG. 17) or resource allocation process (FIG. 18) is performed to compare the current resource allocations against the values in the table 76a. When the values in the table 76a are used to newly run a business application, the resource amount values close to the optimum values can be allocated to the business application from the beginning of its operation. As a result, the business application can be steadily run.

FIG. 6 illustrates the resource capacity weighting table 76b, which retains weight values 143 for resource capacities 142. This table has weight values for the capacities (130 to 132; 133 to 135; 136 to 138; 139 to 141) of various resources, including computer resources such as a CPU 124 and memory 125, a network 126, and a storage 127. Although a plurality of business computers 4, 5 are managed by the management computer 1, the business computers have different resource capacities. For example, the CPU used in an old computer differs in processing capacity from the CPU used in the latest computer. Since the resource capacities 142 of the business computers may differ from each other, the weight values 143 are used to calculate the resource distribution values shown in FIG. 5 for the purpose of absorbing the difference in the processing capacity. When the values calculated through the use of the weight values are used, resource allocation can be properly accomplished in a case where the same business application is run on business computers having different capacities. A typical use of the weight values will now be described. If it is assumed, as shown in FIG. 6, that the weight value is 2 for a CPU having a capacity of 2 GHz and 3 for a CPU having a capacity of 3 GHz, and if the CPU allocation amount for a certain business application is 15% in a business computer having a CPU capacity of 2 GHz, the CPU value in the resource distribution optimization table 76a shown in FIG. 5 is 30, which is obtained by multiplying the value 15% by 2. If the same business application runs on a business computer having a CPU capacity of 3 GHz, the CPU allocation amount is 10%, which is obtained by dividing an optimum value of 30 by a weight value of 3 for a 3-GHz CPU. When the allocation amount is calculated with a weight value in this manner, it is possible to absorb the difference in the resource capacity. For ease of explanation, the figure indicates that the weight value is 2 for a double capacity and 3 for a triple capacity. In reality, however, the processing speed does not always increase twofold even if the resource capacity increases twofold. The weight values should be predefined while considering the above.

As described above, the weight values shown in FIG. 6 are used when the resource distribution optimization table 76a shown in FIG. 5 stores appropriate resource distribution values (120, 121, 122, . . . ) for the business applications (AP1, AP2, AP3, . . . ) and when resources are to be newly allocated (distributed) to the virtual computers.

Figures 7, 8:
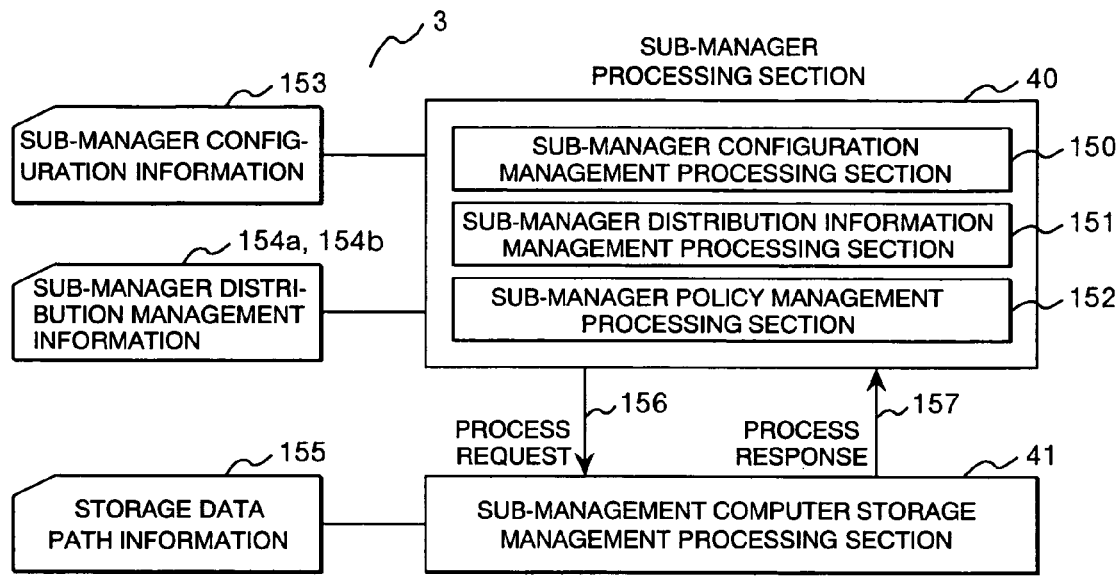
FIG. 7 shows the details of a sub-management computer.
FIG. 8 illustrates a table that presents sub-manager configuration information.

FIG. 7 shows the details of sub-management computer 3. Sub-management computer 3 has the sub-manager processing section 40 and sub-management computer storage management processing section 41. The sub-manager processing section 40 comprises a sub-manger configuration management processing section 150, a sub-manager distribution information management processing section 151, and a sub-manager policy management processing section 152. The sub-manger configuration management processing section 150 manages, processes, and retains sub-manager configuration information 153 such as the information about virtual computers within a business computer that is managed by sub-management computer 3. The sub-manager distribution information management processing section 151 manages, processes, and retains distribution management information 154a, 154b about a business computer that is managed by sub-management computer 3. The sub-manager policy management processing section 152 manages the policy (priority) of a business computer. The sub-management computer storage management processing section 41 has storage data path information 155 about the storage path of business computers 4, 5 that are managed by sub-management computer 3. The sub-manager processing section 40 performs a process in compliance with a processing request from the manager processing section 30. When the sub-manager processing section 40 performs a process in which a storage is referenced, a process request 156 is issued to the sub-management computer storage management processing section 41 to obtain a process response 157.

FIG. 8 shows the details of the sub-manager configuration information 153. The sub-manager configuration information 153 is managed and retained by the sub-manager configuration management processing section 150 of the sub-manager processing section 40. The sub-manager configuration information 153 relates, for instance, to updates of all business computers, virtual computers within the business computers, storage paths, and business applications, which are performed after an appropriate business computer is asked to perform a process in compliance with a process request from the manager processing section 30. The sub-manager configuration information 153 to be retained comprises the information about a business computer 203, a business computer address 204, the information about a virtual computer 205, the information about a storage path 206, the information about a business application 123, and the information about a business application operation 207. The sub-manager configuration information 153 includes the information about all the business computers and virtual computers that are managed by the sub-manager processing section 40. Therefore, an appropriate business computer (Tokyo 1) can be asked to perform processes (200, 201, 202, . . . ) in compliance with a process request from the manager processing section 30. The sub-manager configuration management processing section 150 updates the sub-manager configuration information 153 when, for instance, a business computer is added/deleted, a virtual computer in a business computer is generated/deleted, a storage path is changed, or a business application is started/stopped.

FIGS. 9 and 10 show the details of sub-manager distribution management information (resource capacity management table 154*a* and distribution information management table 154*b*), which is updated or otherwise managed, processed, and retained by the sub-manager distribution information management processing section 151 of the sub-manager processing section 40.

FIG. 9 illustrates the resource capacity management table 154*a*, which retains the resource capacity information (100 to 102) about business computers A (Tokyo 1), B, C, and so on. The resource capacity information includes the information about computer resources such as a CPU 124 and memory 125, a network 126, and a storage 127. As indicated by the reference numeral 100, business computer A, for instance, has a CPU capacity of 2 GHz, a memory capacity of 3 GB, a network capacity of 50 Mbps, and a storage capacity of 200 Mbps. The information about the resource capacities is periodically transmitted from the business computers 4, 5 to the sub-manager distribution information management processing section 151. The sub-manager distribution information management processing section 151 updates the resource capacity management table 154*a*.

FIG. 10 illustrates the distribution information management table 154*b*, which retains the distribution management information about virtual computers A1 (Tokyo 1-1) through A3 (Tokyo 1-3), B1, B2, and so on. This table retains the present distribution information and past distribution information about virtual computers A1 to A3, B1, B2, and so on in all business computers (A, B, . . . ) that are managed by the sub-manager processing section 40. The distribution information is periodically transmitted from the business computers 4, 5 to the sub-manager distribution information management processing section 151. The sub-manager distribution information management processing section 151 updates the distribution information management table 154*b*. As indicated in FIG. 10, business application AP1 runs on virtual computer A1, which is within business computer A. The figure indicates that the CPU use ratio, memory use ratio, network use ratio, and storage use ratio are 30%, 40%, 60%, and 30%, respectively. These resource use ratios represent the proportions to the resource amounts (distributions) that are allocated as indicated in a resource allocation table 215, which is shown in FIG. 12. Therefore, if the resource use ratio is 100%, it means that the resources for a virtual computer are not sufficient. In such a situation, it is necessary to change the resource allocation amounts for the virtual computer.

Figure 11:
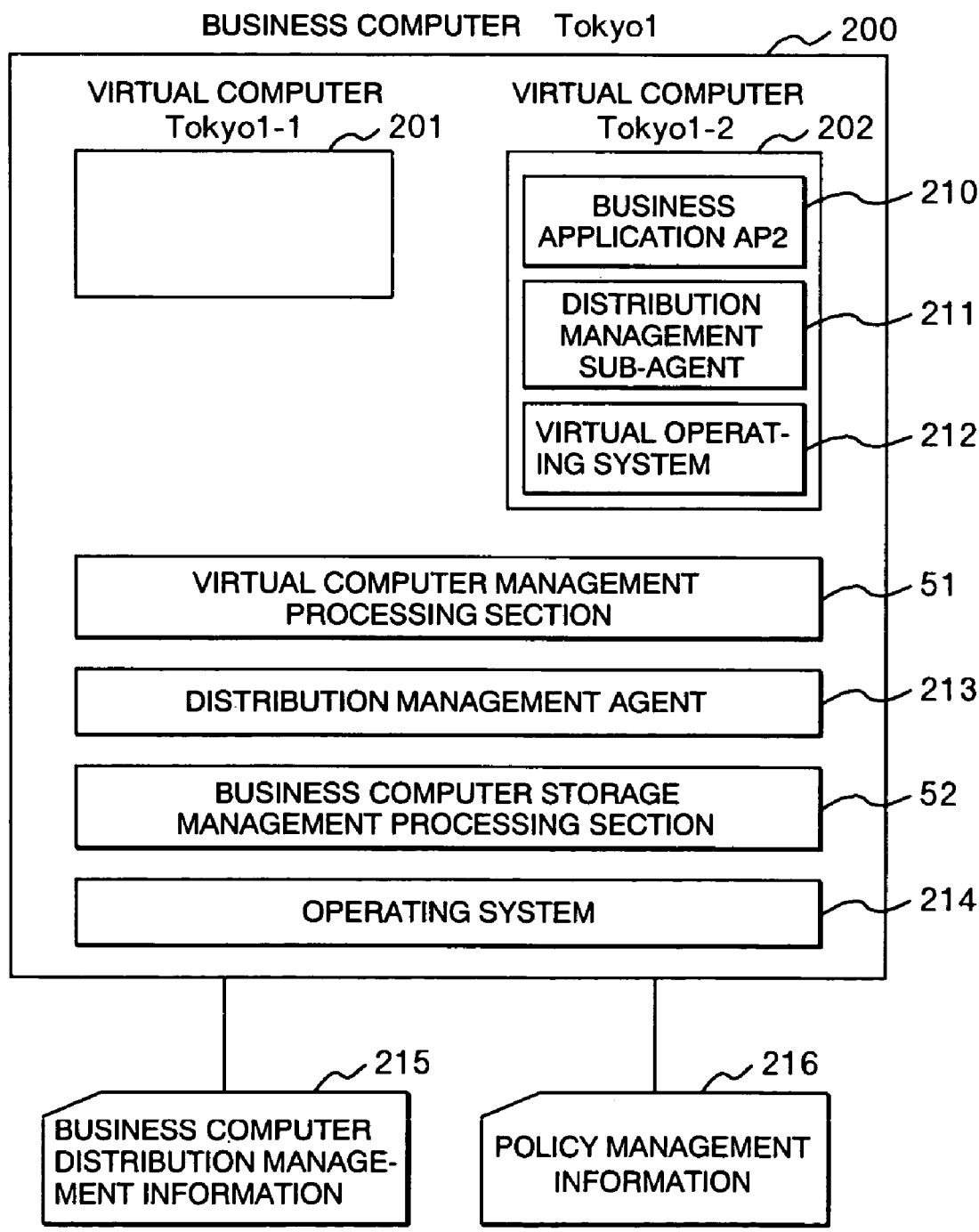
FIG. 11 shows the details of a business computer that is in a state illustrated in FIG. 8.

FIG. 11 illustrates business computer Tokyo 1, which is in a state indicated in FIG. 8. The state indicated in FIG. 11 prevails immediately before virtual computer Tokyo 1-1 (201) is generated. Business computer Tokyo 1 (200) has business computer distribution management information 215, which includes the information about business applications running on business computer Tokyo 1, and policy management information 216, which includes the information for use in policy execution. When business application AP1 shown in FIG. 8 is to be run, the virtual computer management processing section 51 generates a virtual computer 201, and then runs a distribution management sub-agent 211 on virtual computer 201. Finally, business application AP1 is run so that the sub-manager configuration information 153 shown in FIG. 8 is updated. The reference numeral 212 denotes a virtual operating system for the generated virtual computer. The reference numeral 213 denotes a distribution management agent for business computer 200. The reference numeral 214 denotes an operating system for business computer 200.

FIG. 12 shows the details of the resource allocation table 215, which retains business computer distribution management information for business computer 200. This table retains the information about the amounts of resource allocations for each of business applications AP1, AP2, and AP3. The information about resource allocation amounts includes the information about computer resources such as a CPU 124 and memory 125, a network 126, and a storage 127. The table also contains the information about the total allocation amounts 223 and unused resource amounts 224 within the business computer. As regards business application AP1, FIG. 12 indicates that the CPU, memory, network, and storage allocation amounts are 40%, 30%, 30%, and 20%, respectively. If any unused resource exists, it can be allocated as needed to the business application. When the unused resource amount is 0% (the total allocation amount is 100%), all the business computer resources are already allocated. Even if any resource is needed for the business application in such a situation, resource allocation cannot be accomplished. In such an instance, it is necessary to perform a resource recovery process (FIG. 17) for the purpose of allocating the resources in accordance with the priorities of the business applications.

FIG. 13 shows the details of a priority table, which presents policy management information 216 and indicates the priorities of business applications. The priority table retains the information about the priorities of business applications AP1 through AP3, which are executed by a business computer. This table retains the information about the priorities 233 of all business applications (AP1 to AP3) within a business computer. The policy management information 216 contained in this table also includes the information about a resource allocation unit (1% in FIGS. 17 and 18) and a threshold value for judging whether the resource recovery process should be performed (a usage ratio of lower than 70% in FIG. 17). The resource allocation unit and threshold value can be set variously for all business applications. The administrator can set the policy management information 216 from the client computer 15. A request issued by the client computer 15 is transmitted to the distribution management agent 213 shown in FIG. 11 via the policy management processing section 72 of the manager processing section 30 and the sub-manager policy management processing section 152 of the sub-manager processing section 40 shown in FIGS. 3 and 7. The distribution management agent 213 updates the policy management information 216.

Figure 14:
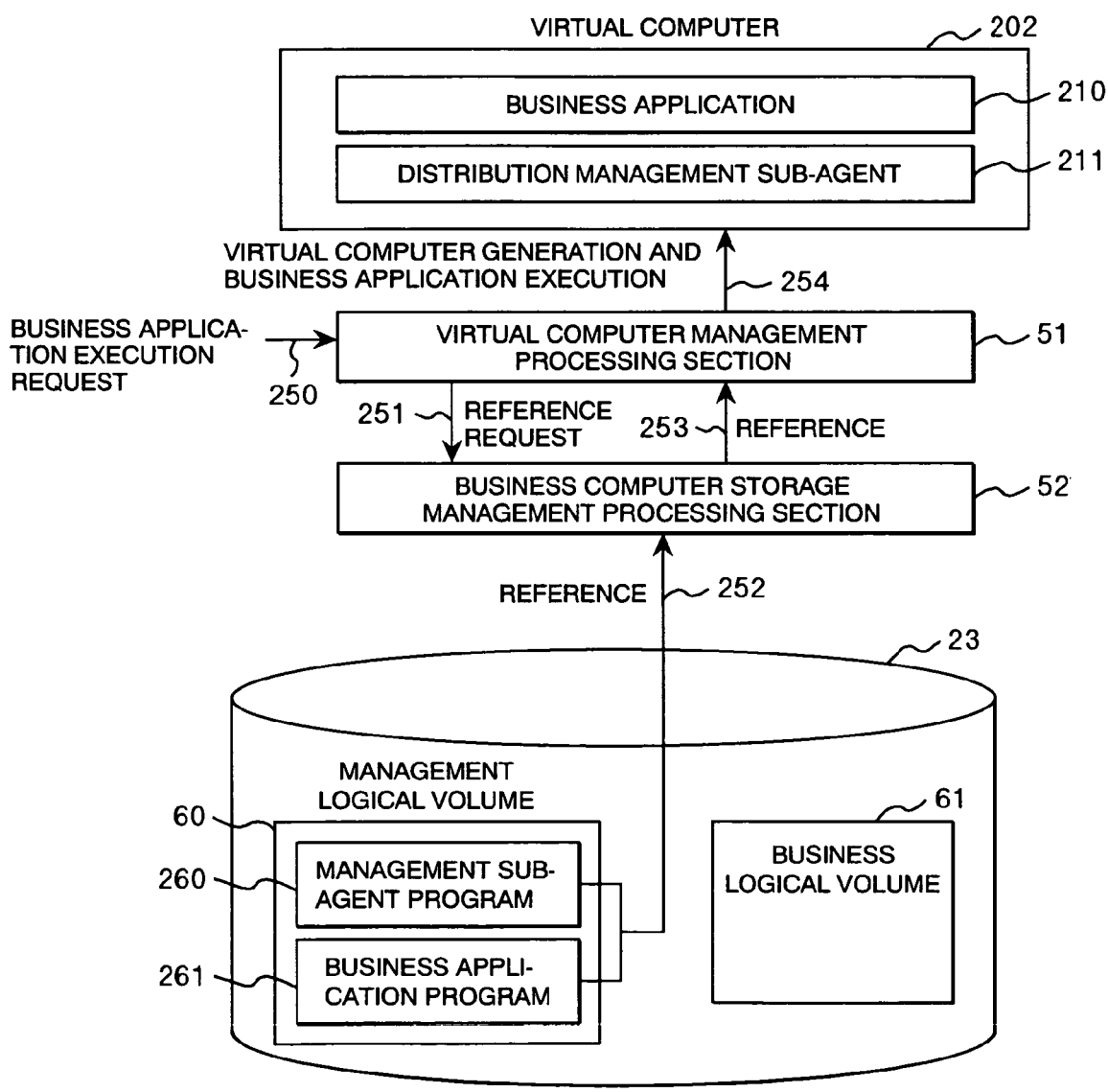
FIG. 14 illustrates the generation of a virtual computer and the executions of a performance management sub-agent and business application.

FIG. 14 illustrates the generation of a virtual computer 202 and the execution of a business application 210. When a request for executing the business application 210 is received from a business computer, the virtual computer management processing section 51 sets a storage path for a business logical volume 61 and generates a virtual computer 202. Next, a reference request 251 for a management sub-agent program 260 and a business application program 261 is issued to the business computer storage management processing section 52. Upon receipt of the request, the business computer storage management processing section 52 obtains the requested program reference from the management logical volume 60 of a storage 23 (252), and passes the reference 253 to the virtual computer management processing section 51. The virtual computer management processing section 51 starts the management sub-agent program 260 on the virtual computer 202 and then starts the business application program 261.

Figure 15:
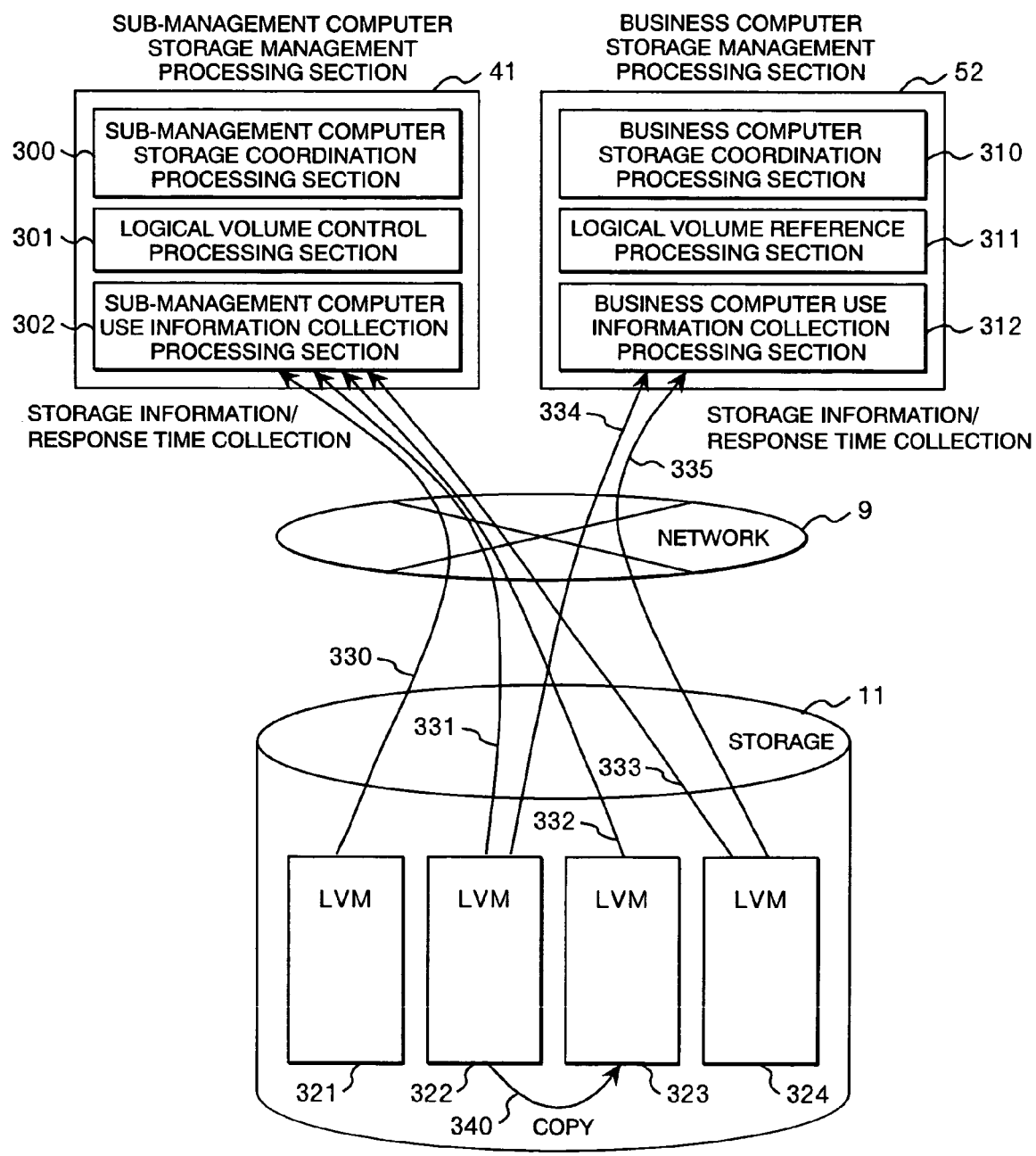
FIG. 15 illustrates the performance management of a storage.

FIG. 15 illustrates the distribution management of the storage 11 and network 9. The sub-management computer storage management processing section 41 comprises a sub-management computer storage coordination processing section 300, a logical volume control processing section 301, and a sub-management computer use information collection processing section 302. The business computer storage management processing section 52 comprises a business computer storage coordination processing section 310, a logical volume reference processing section 311, and a business computer use information collection processing section 312. The storage 11 has a plurality of logical volumes (storage resources) LVM321, LVM322, LVM323, LVM324. The sub-management computer storage coordination processing section 300 coordinates with the business computer storage coordination processing section 310 so that a storage control request from the logical volume control processing section 301 can be conveyed to the business computer storage management processing section 52. The sub-management computer use information collection processing section 302 collects the information about all logical volumes in an available storage 11, the response time (capacity information), and the information about all networks from the business computer 200 (330, 331, 332, 333). In other words, the sub-management computer use information collection processing section 302 collects the information about all available networks and storages from the business computer 200.

The business computer use information collection processing section 312 of the business computer storage management processing section 52 collects the information about all networks and logical volumes that can be referenced from the business computer as well as the information about response time (capacity information) (334, 335). In other words, the business computer use information collection processing section 312 collects only the information about networks and storages that the business computer and the virtual computers within the business computer actually use. The business computer use information collection processing section 312 of the business computer storage management processing section 52 corresponds to the means (functionality) for monitoring the network resource use and storage resource use by the business applications for the virtual computers (use ratios).

If the performance of an employed logical volume or the response time (capacity) of a network is not satisfactory for the business computer, the logical volume control processing section 301 can switch to another logical volume (another storage resource). If, for instance, the performance (capacity) of logical volume LVM322 is inadequate, the logical volume control processing section 301 selects an appropriate logical volume LVM323 and copies the LVM322 data to logical volume LVM323 (340). After completion of this copy operation, the logical volume control processing section 301 notifies the business computer storage coordination processing section 310 of a storage path change. After the storage path change, the storage path for the sub-manager configuration information shown in FIG. 8 is updated. Finally, the data of logical volume 322 is deleted because it is no longer needed. As described above, if the performance (capacity) of a storage used by the business computer is inadequate, it is possible to allocate the optimum storage resource that is managed by the sub-management computer use information collection processing section 302.

Figure 16:
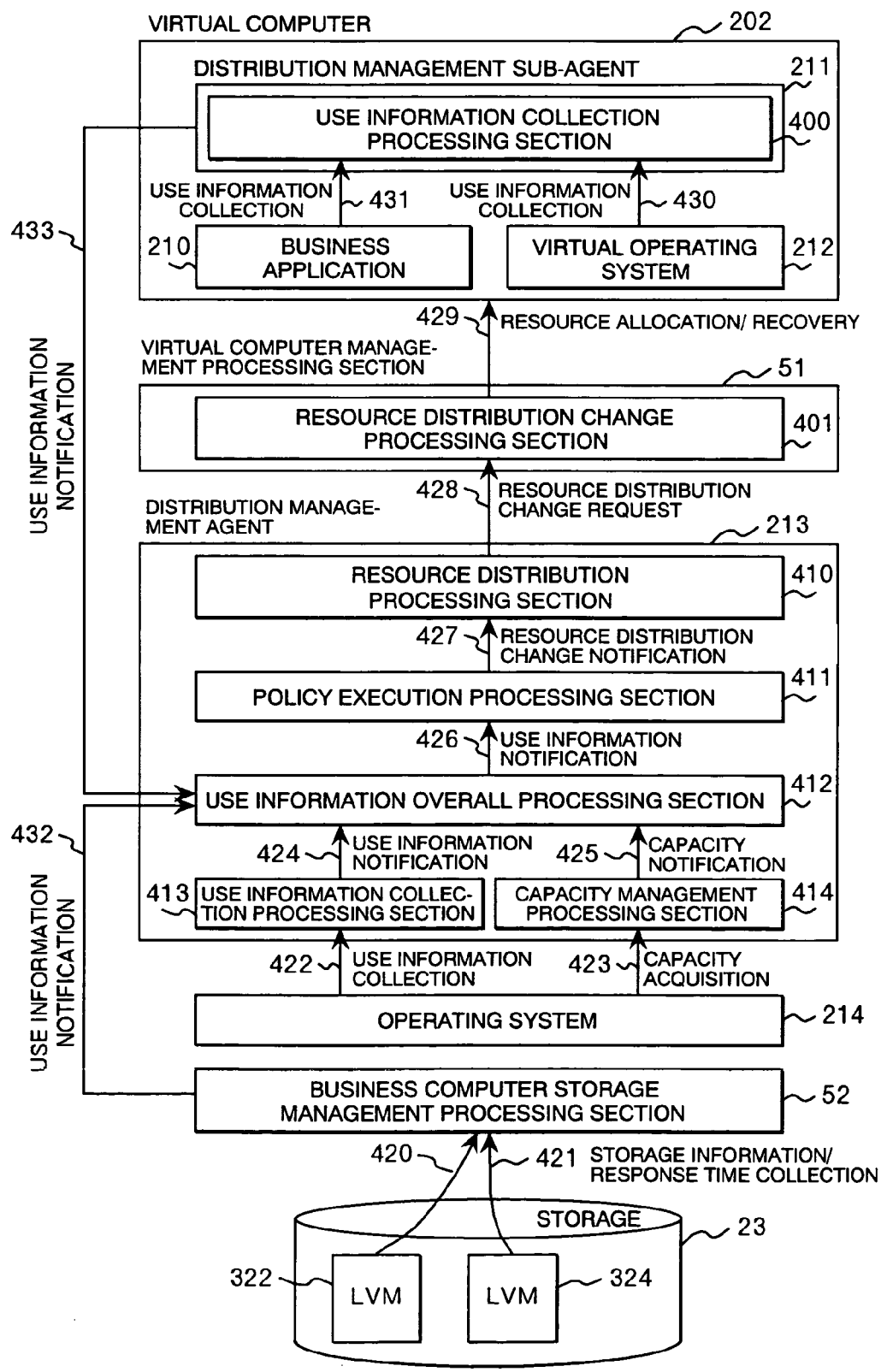
FIG. 16 illustrates how performance management is exercised within a business computer.

FIG. 16 illustrates how resource use information is collected within a business computer and how resource distribution management is exercised. The distribution management agent 213 comprises a resource distribution processing section 410, a policy execution processing section 411, a use information overall processing section 412, a use information collection processing section 413, and a capacity management processing section 414. The use information collection processing section 413 and capacity management processing section 414 acquire the information about computer resource use (use status) and capacity within a business computer from an operating system 214 of the business computer (422, 423). The acquired information is conveyed to the use information overall processing section 412 (424, 425).

The distribution management sub-agent 211 of the virtual computer 202 has a use information collection processing section 400 and collects the information about computer resource use in each virtual computer from a business application 210 and virtual operating system 212 (430, 431). The use information collection processing section 400 conveys the collected use information (use status) to the use information overall processing section 412 of the distribution management agent 213 (433).

The business computer storage management processing section 52 collects storage-related use information (use status) from the storage 23 and network-related use information (use status) from the network 9 (420, 421). The collected use information is then conveyed to the use information overall processing section 412 of the distribution management agent 213 (432).

In accordance with the conveyed use information, the use information overall processing section 412 updates the resource capacity management table 154a shown in FIG. 9 and the distribution information management table 154b shown in FIG. 10. The policy execution processing section 411 transmits a resource distribution change notification to the resource distribution processing section 410 in accordance with the use information (use status of each resource) retained by the use information overall processing section 412, the policy specified by the administrator, and the priorities of business applications (427). The resource distribution processing section 410 issues a distribution change request 428 to a resource distribution change processing section 401 of the virtual computer management processing section 51 to update the information (use ratios allocated to various resources) in the resource allocation table 215 shown in FIG. 12.

As described above, the use information collection processing section 413, capacity management processing section 414, sub-management computer use information collection processing section 302, and business computer use information collection processing section 312 correspond to the means (functionality) for monitoring the use of resources (e.g., computer, network, and storage) within a business computer. Particularly, the use information collection processing section 413 and capacity management processing section 414 correspond to the means (functionality) for monitoring the use of computer resources within a business computer. The resource use status within the business computer indicates the use ratios for the use of the resources allocated to various virtual computers.

Further, the use information collection processing section 400 and business computer use information collection processing section 312 correspond to the means (functionality) for monitoring the use of resources for business applications running on various virtual computers within the business computer. Particularly, the use information collection processing section 400 corresponds to the means (functionality) for monitoring the use of computer resources for business applications running on various virtual computers within the business computer. The monitored use of resources indicates the use ratios of resources (computer, network, storage, etc.) allocated to each business application (each virtual computer).

In a system in which the business applications according to the present invention run on the virtual computers (A1 to A3, B1, B2, ... ) within the business computers (A, B, ... ), the amounts of resources required for the business applications vary with time during business application operations because, for instance, the data amount and processing volume vary with time. Therefore, the resource use ratios of computer resources such as a CPU and memory, network resource (network performance), and storage resource (performance of data access to storage) dynamically vary. When the business applications run on the virtual computers within the business computers, the use information overall processing section 412 performs a collection operation in a state in which a dynamic change occurs in the use ratios of resources that are monitored by the use information collection processing section 413 and other sections of a business computer and the use information collection processing section 400 and business computer storage management processing section 52 of a virtual computer. As a result of such a collection operation, any extra resource can be recovered and allocated to another virtual computer when the associated resource use ratio is low. In this manner, the resources can be used efficiently without being wasted.

To steadily run the business applications in the above situation while maintaining the relationship among the business computer, virtual computer, network, and storage resources, it is necessary to perform a resource recovery process, a resource allocation process, and a business application deletion/addition process.

Figure 17:
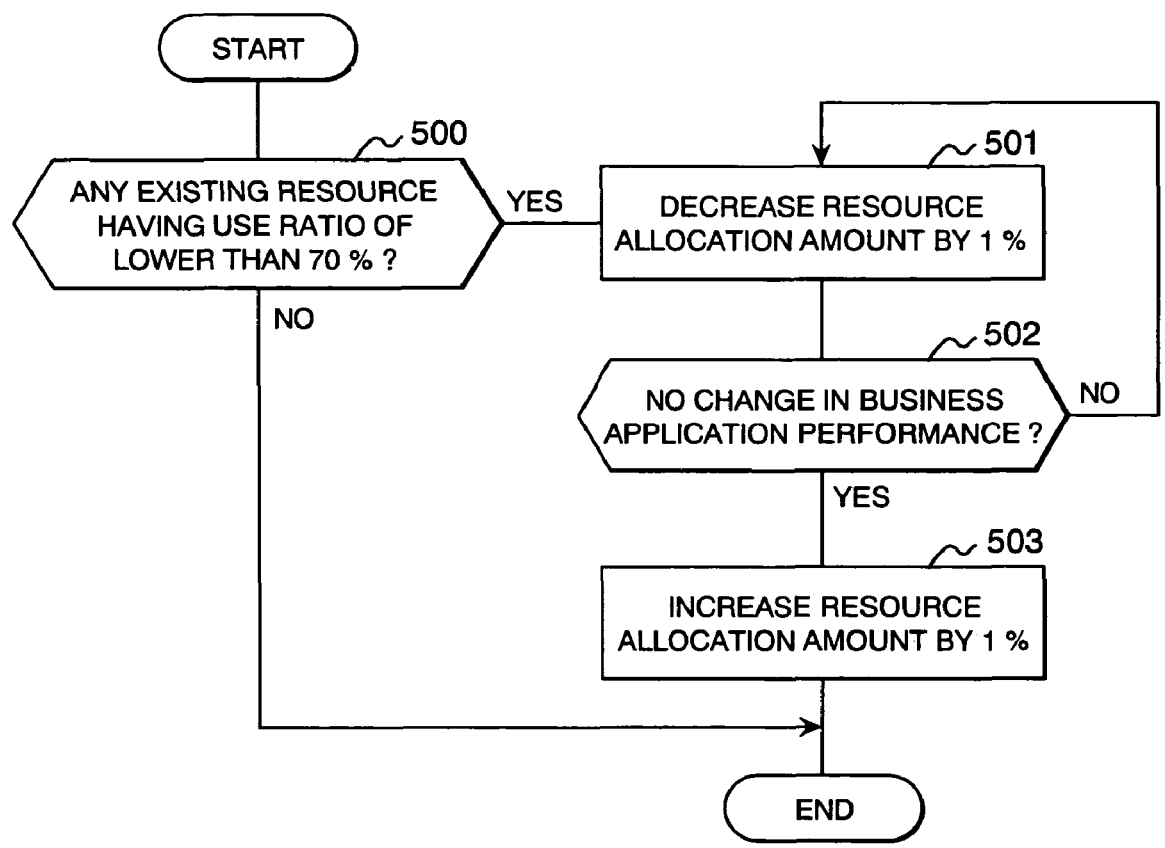
FIG. 17 is a flowchart illustrating a resource recovery process.
Figure 18:
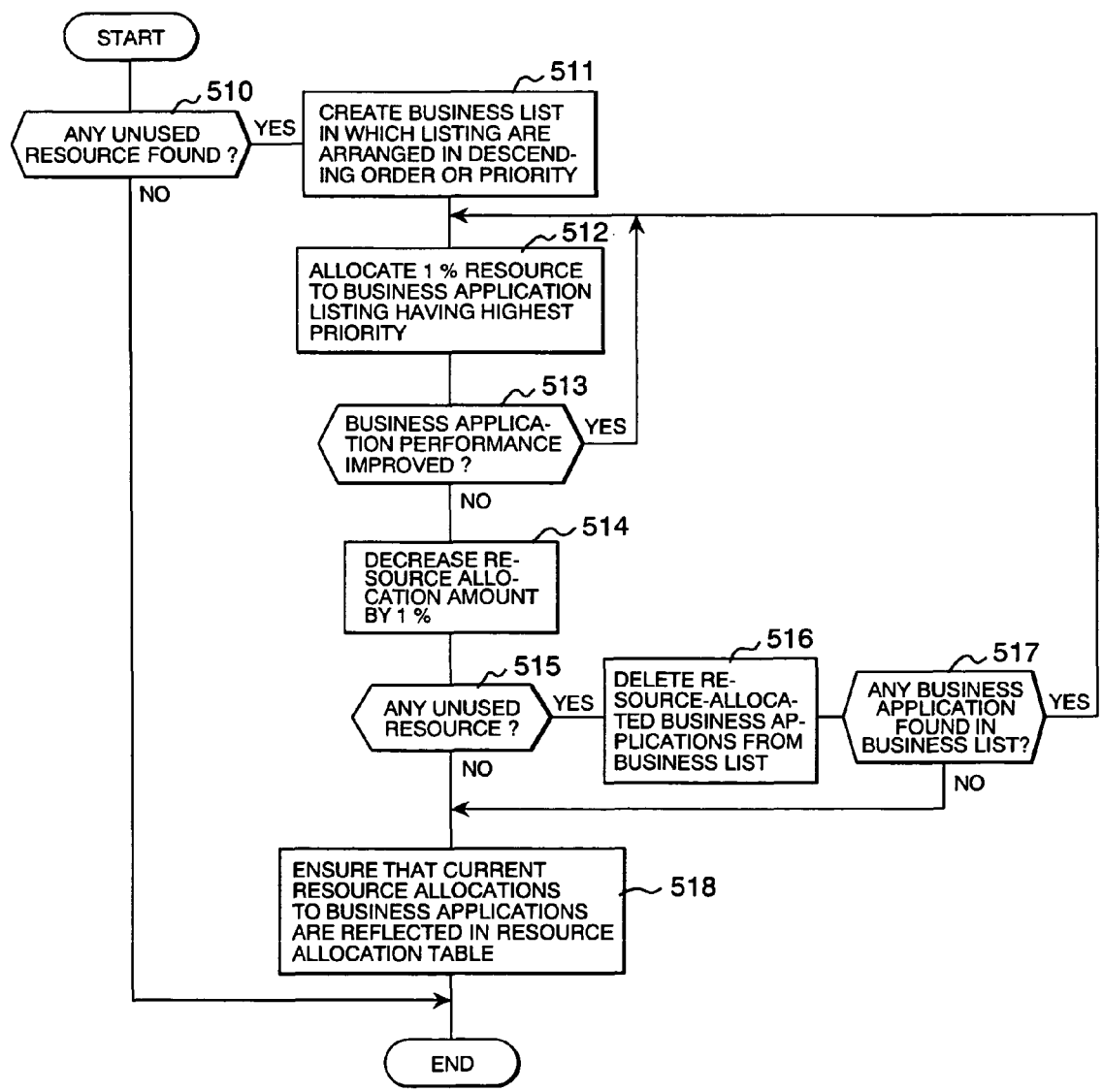
FIG. 18 is a flowchart illustrating a resource allocation process.

The above-mentioned processes will now be sequentially described. The resource recovery process shown in FIG. 17 and the resource allocation process shown in FIG. 18 are performed, for instance, by the policy execution processing section 411, resource distribution processing section 410, and resource distribution change processing section 401.

First of all, the resource recovery process will be described in detail with reference to FIG. 17. The resource recovery process is performed by the use information overall processing section 412 in accordance with the information about resource use, which is collected from various virtual computers within a business computer. The resources for the virtual computers within the business computer are first checked (step 500) to determine whether the resource use ratios are smaller than the threshold value (e.g., 70%) that is preset by the system administrator. If no resource use ratios are smaller than the threshold value, the process terminates immediately. If any resource use ratio is smaller than the threshold value, the resource allocation amount (allocation unit) is decreased, for instance, by 1% in compliance with an instruction from the policy execution processing section 411 (step 501). The administrator can change the resource allocation unit value at the client computer 15. Next, step 502 is performed to check whether the resource allocation decrease affects the business application performance. This check is performed in accordance with the performance information about the business application 210, which is collected as indicated by the reference numeral 431 in FIG. 16. If the performance remains unaffected, the program flow returns to step 501 to further decrease the allocation amount. If the business application performance is affected, the resource allocation amount is increased by 1% to restore the previous state (step 503). As a result, the extra resource amount, which prevails after allocation amount reduction, is calculated. The resource distribution processing section 410 then pools the calculated resource amount into the resource allocation table 215, thereby terminating the resource recovery process. The extra resource is managed by an "Unused resource" value 224 in the resource allocation table 215 of the business computer 200, which is shown in FIG. 12. The resource recovery process is performed for all the virtual computers within the business computers in the manner described above.

The resource allocation process, which is performed in accordance with the resource use status collected from a business computer by the use information overall processing section 412, will now be described in detail with reference to FIG. 18. If any unused (extra) resources exist on the business computer, they are sequentially allocated to virtual computers, beginning with a virtual computer running the highest-priority business application that requires resources. In this manner, the business applications can be steadily run. This process is periodically performed.

More specifically, step 510 is first performed to check for unused resources on the business computer. If there is no unused resource, nothing is performed and the resource allocation process terminates. If there is any unused resource, the resource allocation process continues. If, for instance, business applications AP1, AP2, and AP3 are running while their priorities are respectively low, medium, and high, step 511 is performed to create a business list in which the business applications are arranged in the descending order of priority (AP3, AP2, AP1). Step 512 is then performed to allocate a resource allocation unit (e.g., 1%) to the listed business application having the highest priority. The resource allocation unit is retained by the policy management information 216. The administrator can change the resource allocation unit from the client computer 15. Next, step 513 is performed to check whether the performance of the business application to which the resource has been allocated is improved. If the performance is improved, the program flow returns to step 512 to perform resource allocation. If, on the other hand, the performance is not improved (the performance is not enhanced by the resource allocation increase), the resource allocation amount is decreased by 1% to restore the previous state (step 514) for the purpose of avoiding an extra resource allocation. Step 515 is then performed to check whether any unused (extra) exists. If any unused (extra) resource exists, the business application to which the resource is already allocated is deleted from the business list (step 516). Next, step 517 is performed to check for remaining business applications in the business list. If business applications AP1 and AP2 still exist in the business list, step 512 is performed to allocate the resource to business applications AP1 and AP2, which are in the business list, in the descending order of priority. If no unused resource is found in step 515 or if it is found in step 516 that the business list contains no business application to which the resource is to be allocated, the resource allocations to the virtual computers within the business computer become reflected in the resource allocation table 215 shown in FIG. 12 (step 518), and then the resource allocation process terminates.

In the resource recovery process and resource allocation process described above, the policy execution processing section 411 issues an instruction for resource increase/decrease; the resource distribution processing section 410 updates the resource allocation table 215 shown in FIG. 12; and the resource distribution change processing section 401 changes the resource allocation amount for a virtual computer upon receipt of the instruction for resource increase/decrease.

Figure 19:
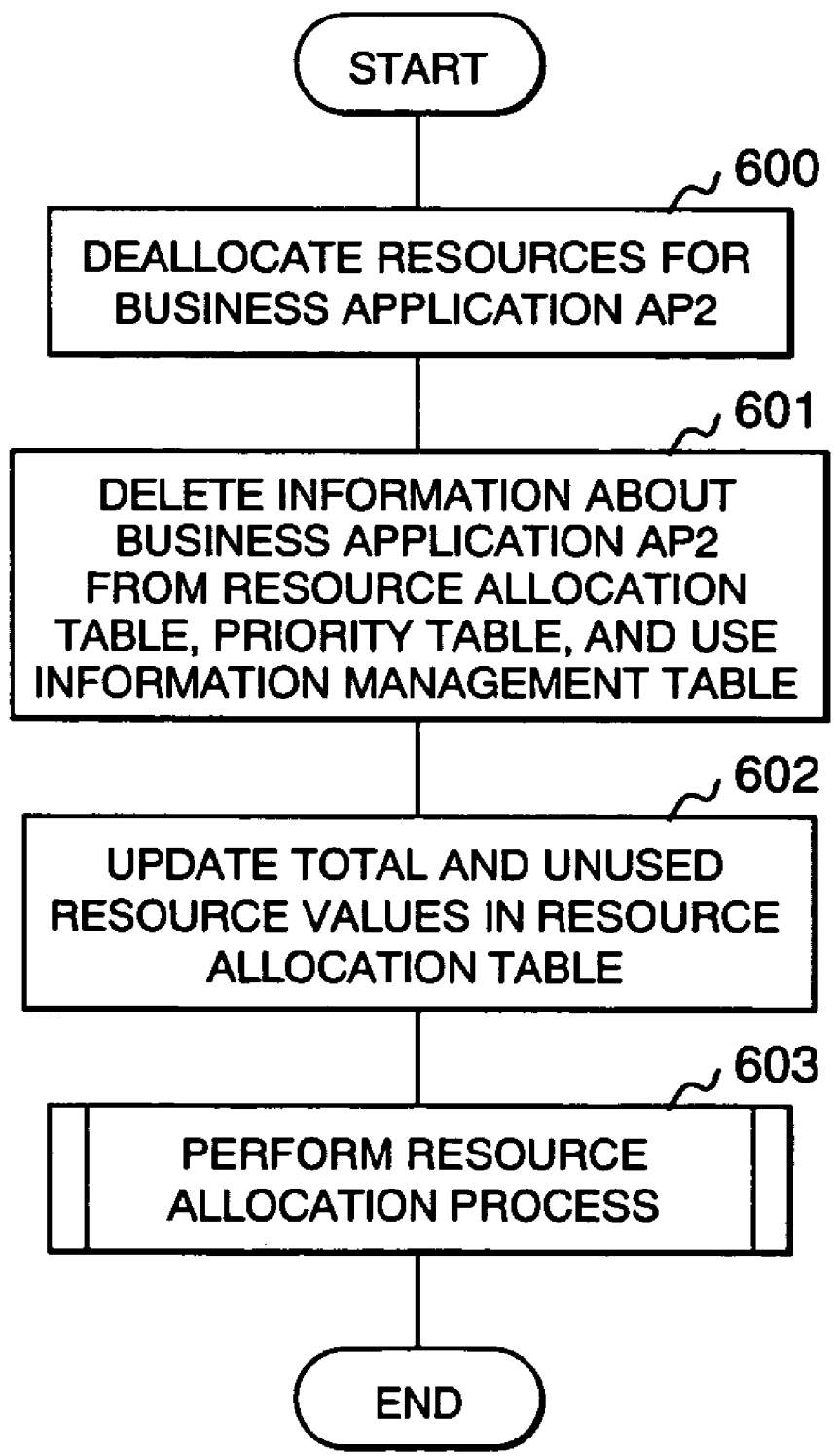
FIG. 19 is a flowchart illustrating a process that is performed to delete business application AP2.

The process for deleting business application AP2 in accordance with the resource allocation table shown in FIG. 12 and the priority table shown in FIG. 13 will now be described in detail with reference to FIG. 19. First of all, step 600 is performed to deallocate (release) the resources for a virtual computer on which business application AP2 is running. Next, step 601 is performed to delete the information about business application AP2 from the resource allocation table, priority table, and distribution information management table (FIG. 10). Step 602 is then performed to update the "Total" value 223 and "Unused resource" value 224 in the resource allocation table. Now, there are unused resources for the business computer. Therefore, the unused resources are allocated to the business applications existing in the business computer (step 603).

Figure 20:
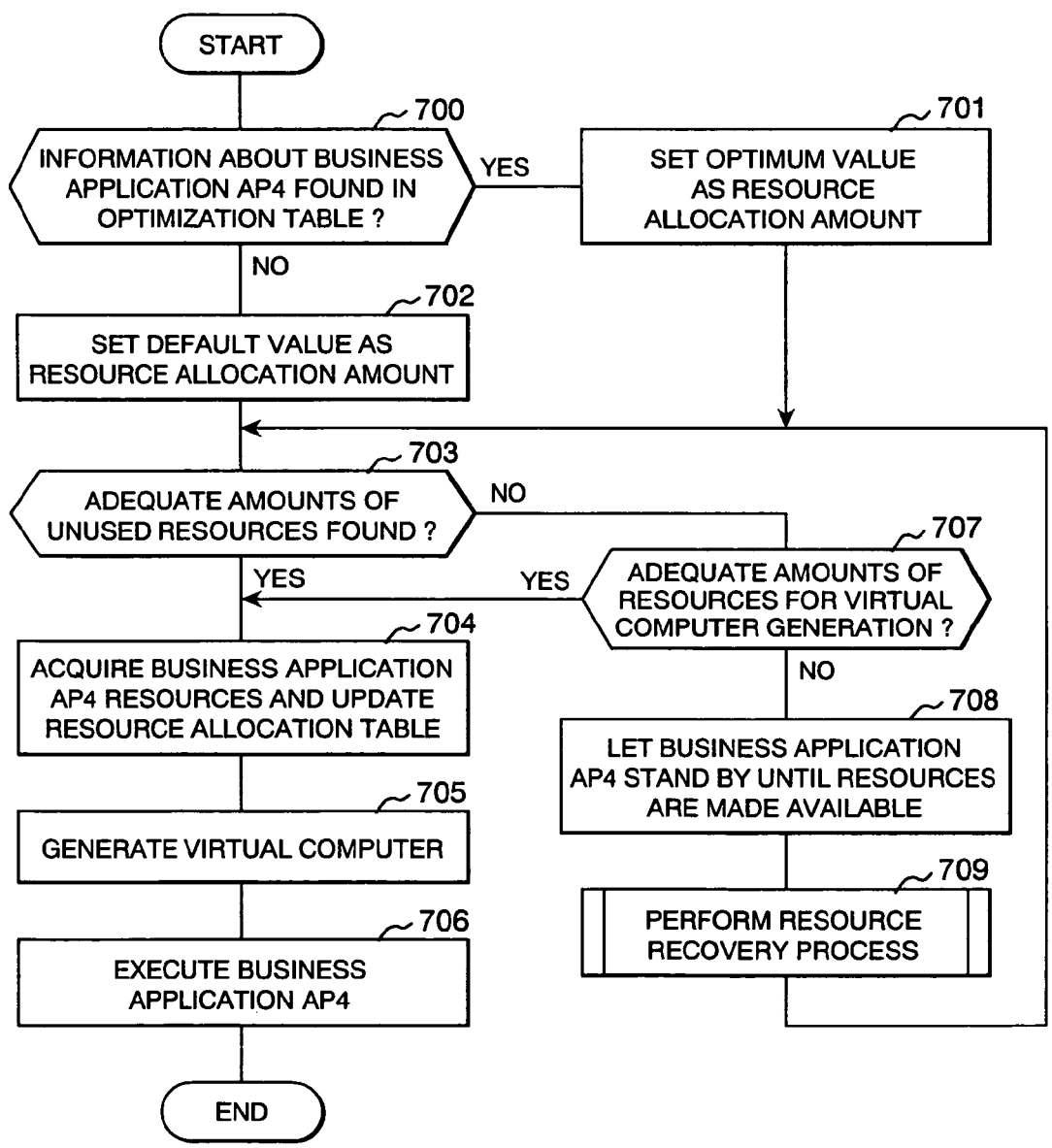
FIG. 20 is a flowchart illustrating a process that is performed to add business application AP4, which has a "low" priority.

The process for adding business application AP4, which has a low priority, in accordance with the resource allocation table shown in FIG. 12 and the priority table shown in FIG. 13 will now be described in detail with reference to FIG. 20. First of all, step 700 is performed to check whether the information about business application AP4 exists in the resource distribution optimization table 76a shown in FIG. 5. If the information is found, step 701 is performed to allocate the resource allocation amount that is calculated from the resource distribution optimization table 76a and the resource capacity weighting table 76b shown in FIG. 6. If, on the other hand, the information is not found, the default value preselected by the system administrator is set as the resource allocation amount (step 702). Next, step 703 is performed to check whether the resources required for allocation exist. If the resources are not sufficient, step 707 is performed to check whether the amounts of resources are adequate for virtual computer generation. If a virtual computer cannot be generated, the sequence for generating business application AP4 is forced to stand by until adequate resources are available (step 708), and then the resource recovery process is periodically performed (step 709). If it is found in step 703 that there are adequate amounts of unused resources, step 704 is performed to accomplish resource acquisition and update the resource allocation table. Next, step 705 is performed to generate a virtual computer for executing business application AP4. In step 706, the generated virtual computer executes business application AP4. FIG. 20 illustrates a case where the priority is low. If the priority is medium or high, the contents of processing step 708 are different from those for a low priority. When a business application having a medium or high priority is to be added in a situation where an existing business application has a lower priority than the business application to be added, processing step 708 is not performed, but an alternative process is performed to stop the business application having the lower priority and achieve resource recovery. If there is no lower-priority business application, processing step 708 is performed as is the case where the priority is low.

The business application addition/deletion operation described above is performed by the virtual computer management processing section 51 shown in FIGS. 14 and 16. FIG. 14 illustrates an embodiment for business application addition.

What is claimed is:

1. A computer resource control method for executing business applications on virtual computers within a computer including resources which are the computer itself, a network, and storage, the computer resource control method executed by the computer, comprising the steps of:
   allocating at least part of a first predetermined available amount of the resources to a first virtual computer for executing at least one business application;
   periodically gathering a use ratio of the part of the resources allocated to the first virtual computer in executing the first one of the at least one business application to the first predetermined available amount of the resources;
   calculating amounts of unused resources not used by the first virtual computer for the execution of the first business application on the first virtual computer, based on a comparison of the gathered use ratio of the resources with a predetermined threshold value;
   if the gathered use ratio of the resources is less than the predetermined threshold value, de-allocating a second predetermined amount of the allocated resources from the first virtual computer, a value of the second predetermined amount being defined as a constant value and being smaller than a value of both the first predetermined available amount and the calculated amount;
   collecting performance results of the first business application executed on the first virtual computer;
   determining whether the performance of the first business application executed on the first virtual computer is affected according to de-allocating from the first virtual computer the second predetermined amount of the resources, based on the collected performance results of the first business application;
   re-allocating, to the first virtual computer, the second predetermined amount of the resources de-allocated from the first virtual computer, in order to restore the previous state of the performance of the first business application, if the performance of the first business application executed on the first virtual computer is affected as a result of the second predetermined amount of the resources being de-allocated from the first virtual computer; and
   repeating said de-allocating if the performance of the first business application executed on the first virtual computer is not affected as the result of the second predetermined amount of the resources being de-allocated from the first virtual computer.

2. The computer resource control method according to claim 1, further comprising;
   allocating to a second virtual computer the second predetermined amount of resources de-allocated from the first virtual computer in accordance with priority of a second business application executed by the second virtual computer;
   collecting performance results of the second business application executed on the second virtual computer;

determining whether the performance of the second business application executed on the second virtual computer is affected according to the allocating to the second virtual computer the second predetermined amount of the resources, based on the collected performance results of the second business application;

de-allocating, from the second virtual computer, the second predetermined amount of resources allocated from the first virtual computer in order to resume the state of the performance, if the performance of the second virtual computer is not affected as a result of the second predetermined amount of the resources being allocated to the second virtual computer by the allocating step; and repeating said allocating to the second virtual computer the second predetermined amount of resources de-allocated from the first virtual computer if the collected performance of the second virtual computer is affected as a result of the allocating to the second virtual computer the second predetermined amount of resources de-allocated from the first virtual computer.

3. The computer resource control method according to claim 2, wherein each of the re-allocating step and the de-allocating steps includes a step of storing in a distribution optimization table each amount of the resources allocated to the first and the second virtual computers as optimal values of the resources for the at least one business application and the another business application.

4. A computer resource control method for executing a business application on a first virtual computer and executing another business application on a second virtual computer within a computer including resources which are the computer itself, a network, and storage, the computer resource control method executed by the computer, comprising the steps of:

allocating at least part of a first predetermined available amount of the resources to the first virtual computer for executing at least one first business application and to the second virtual computer for executing at least one second business application;

periodically gathering a use ratio of the part of the resources allocated to the first virtual computer in executing the at least one first business application to the first predetermined available amount of the resources;

calculating amounts of unused resources not used by the first virtual computer for the execution of the first business application, based on a comparison of the gathered use ratio of the part of the resources allocated to the first virtual computer with a predetermined threshold value;

if the gathered use ratio of the resources is less than the predetermined threshold value, de-allocating a second predetermined amount of the allocated resources from the first virtual computer, and a value of the second predetermined amount being defined as a constant value and being smaller than a value of both the first predetermined available amount and the calculated amount;

collecting performance results of the first business application executed on the first virtual computer;

determining whether the performance of the first business application executed on the first virtual computer is affected according to the de-allocating from the first virtual computer the second predetermined amount of the resources, based on the collected performance results of the first business application;

collecting performance results of the second business application on the second virtual computer;

determining whether the performance of the second business application executed on the second virtual computer is affected according to the allocating to the second virtual computer the second predetermined amount of the resources, based on the collected performance results of the second business application;

re-allocating, to the first virtual computer, the second predetermined amount of unused resources de-allocated from the first virtual computer, in order to restore the previous state of the first business application, if the performance results indicate that the first business application is affected as a result of the second predetermined amount of the resources being de-allocated from the first virtual computer;

allocating to the second virtual computer the second predetermined amount of unused resources deleted from the first virtual computer;

collecting another performance result of the second virtual computer; and de-allocating from the second virtual computer the second predetermined amount of unused resources allocated to the second virtual computer, if the another performance result indicates that the performance of the second virtual computer is not affected.

5. A computer resource control system for executing business applications on virtual computers within a computer including resources which are the computer itself, a network, and storage, the computer resource control system realized by the computer, comprising:

a resource allocation means for allocating at least part of a first predetermined available amount of the resources to a first virtual computer for executing at least one business application;

a gathering means for periodically gathering a use ratio of the part of the resources allocated to the first virtual computer in executing a first of the at least one first business application to the predetermined available amount of the resources;

a resource recovery means for calculating amounts of unused resources not used by the first virtual computer for the execution of the first business application based on a comparison of the gathered use ratio of the resources with a predetermined threshold value;

if the gathered use ratio of the resources is less than the predetermined threshold value, a de-allocating means for de-allocating a second predetermined amount of the allocated resources from the first virtual computer, and a value of the second predetermined amount being defined as a constant value and being smaller than a value of both the first predetermined available amount and the calculated amount;

a first collecting means for collecting performance results of the first business application executed on the first virtual computer;

a determining means for determining whether the performance of the first business application executed on the first virtual computer is affected according to de-allocating from the first virtual computer the second predetermined amount of the resources, based on the collected performance results of the first business application;

said allocating means re-allocating, to the first virtual computer, the second predetermined amount of the resources de-allocated from the first virtual computer, in order to restore the previous state of the performance of the first business application, if the performance of the first business application executed on the first virtual computer is affected as a result of the second predetermined mount of the resources being de-allocated from the first virtual computer; and said de-allocating means for repeating de-allocating of the second predetermined amount of the allocated resources from the first virtual computer if the performance of first business application executed by the first virtual computer is not affected as the result of the second predetermined amount of the resources being de-allocated from the first virtual computer.

6. The computer resource control system according to claim 5, further comprising:

said resource allocation means for allocating to a second virtual computer the second predetermined amount of resources de-allocated from the first virtual computer in accordance with priority of another business application executed by the second virtual computer;

a second collecting means for collecting performance results of the second virtual computer;

a determining means for determining whether the performance of the second business application executed on the second virtual computer is affected according to allocating to the second virtual computer the second predetermined amount of the resources, based on the collected performance results of the second business application;

said de-allocating means for de-allocating, from the second virtual computer, the second predetermined amount of extra resources allocated to the second virtual computer if the performance of the second virtual computer is not affected as the result of the second predetermined amount of the resources being allocated to the second virtual computer by allocating performed by the resource allocation means; and said allocation means for repeating allocation of the resources to the second virtual computer if the result of the performance of the another business application is affected as the result of allocating to the second virtual computer the second predetermined number of resources de-allocated from the first virtual computer.

7. The computer resource control system according to claim 6, wherein each of the allocation means and the de-allocating means includes a storing means for storing in a distribution optimization table each amount of resources allocated to the first and the second virtual computers as the optimal value of the resources for each of the first business application and the second business application.

8. The computer resource control system according to claim 6, further comprising a policy management means for storing the predetermined amount of resources as policy management information, and changing the policy management information.

* * * * *